(12) United States Patent
Drochon

(10) Patent No.: US 7,896,076 B2
(45) Date of Patent: Mar. 1, 2011

(54) RHEOLOGY MODIFIER FOR CEMENT SLURRIES

(75) Inventor: Bruno Drochon, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 219 days.

(21) Appl. No.: 11/965,285

(22) Filed: Dec. 27, 2007

(65) Prior Publication Data
US 2008/0190615 A1    Aug. 14, 2008

(30) Foreign Application Priority Data

Dec. 27, 2006   (EP) .................................. 06127240

(51) Int. Cl.
*E21B 33/13*   (2006.01)
*C09K 8/467*   (2006.01)

(52) U.S. Cl. ........................ 166/293; 166/300; 106/724

(58) Field of Classification Search ........................ None
See application file for complete search history.

(56) References Cited

U.S. PATENT DOCUMENTS 5,476,144 A * 12/1995 Nahm et al. ................ 166/293

2006/0122071 A1 * 6/2006 Reddy et al. ................ 507/219
2007/0203028 A1 * 8/2007 Lewis et al. ................ 507/221

FOREIGN PATENT DOCUMENTS

WO     2006061561        6/2006

OTHER PUBLICATIONS

Cementing Technology for Low Fracture Gradient and Controlling Loss Circulation, Kris Ravi et al, Halliburton (SPE/IADC 102074).

* cited by examiner

*Primary Examiner*—Zakiya W. Bates
(74) *Attorney, Agent, or Firm*—David Cate; Robin Nava; Matthias Abrell

(57) ABSTRACT

Low-density cement slurries for cementing subterranean wells are described that comprise alkali swellable polymers as thickening agents that provide slurry stability. The polymers are preferably added as liquid latex dispersions, and may also comprise a surfactant that is present at a concentration below its critical micelle concentration. Particular utility is observed when the solid-volume fraction (SVF) of the slurry is less than about 40 percent. Also described are a method for increasing the viscosity of a cement slurry and methods for cementing a subterranean well.

20 Claims, 1 Drawing Sheet

RHEOLOGY MODIFIER FOR CEMENT SLURRIES

CROSS REFERENCE TO RELATED APPLICATIONS

This application claims priority to European patent application EP 06127240.7 filed Dec. 27, 2006.

TECHNICAL FIELD

This invention relates to cement slurries for use in oil well, gas wells and the like, in particular the invention relates to a thickening additive comprising an alkali swellable polymer for use in cement slurries having low density and a low solid volume fraction.

BACKGROUND ART

In the drilling and completion of an oil or gas well, a cementing composition is often introduced in the well bore for cementing pipe string or casing. In this process, known as 'primary cementing', a cement slurry is prepared at the surface and is pumped into the annular space between the casing and the walls of the well bore. The cement composition sets in the annular space, supporting and positioning the casing, and forming a substantially impermeable barrier, or cement sheath. This isolates the well bore into subterranean zones to prevent the undesirable migration of fluids between zones.

There are two main factors that contribute to ensuring zonal isolation during the life of a well. Specifically, the cement should be placed in the entire annulus through efficient mud removal and the properties of the set cement should be optimized so that it can withstand the stresses from various operations that may be conducted during the life of the well.

If the short-term properties of the cementing composition, such as density, static gel strength, and rheology are sufficient, the undesirable migration of fluids between zones is prevented immediately after primary cementing.

Poor zonal isolation results in fluid migration e.g. water or gas may invade an oil-bearing zone, which can eventually result in a risk of blow out, or to less severe but economically challenging problems such as water production (and the need to provide expensive water treatment surface facilities) or loss of reserves and productions. Remedial work to repair a faulty cementing job is expensive (inasmuch as it increases rig time and delays oil or gas production) and can sometime lead to irreparable harm to the hydrocarbon-bearing production. In most cases, poor zonal isolation results from poor mud removal as the well is initially filled with mud.

It is desirable to adjust the density of the cement such that the pressure exerted by the cement on the formation at the bottom of the well compensates at least for the formation pore fluid pressure so as to avoid any risk of influxes. The upper limit of hydrostatic pressure generated by the column of cement plus the head losses due to the circulation of the fluids being pumped must remain below the fracturing pressure of the rocks in the section being cemented. Certain geological formations are very fragile and require densities lower to that of water to avoid such fracturing.

Since the risk of influx diminishes with column height, the density required for compensating pore pressure can be lower if a large column height is used. Furthermore, cementing over a large height is advantageous since that makes it possible to reduce the number of sections that must be cemented. All of these factors favor the use of cement slurries of low density.

To produce lighter (less dense) slurries, the simplest known technique is to produce extended slurry in which the quantity of water is increased compared to normal slurry while adding stabilizing additives (known as "extenders") to the slurry for the purpose of avoiding settling of particulate materials and/or formation of free water at the surface of the slurry.

Among the most common extenders that are used are sodium silicate and bentonite. One of the main features of these extended slurries is their very low plastic viscosity that is a consequence of the low solid volume fraction (less than 45%). This very low viscosity can very often be the main cause of poor mud displacement and therefore of a bad zonal isolation.

The simplest known technique to increase the plastic viscosity is to add a high molecular weight polymer to the slurry (as cellulosic based polymers). These polymers are generally available in a solid form. This can be an issue from a logistical point of view, specifically for offshore applications when liquid additives are preferred.

These polymers are also often available in oil-based emulsion, but this tends to result in products that are very expensive products and/or have a bad environmental footprint.

Therefore an object of the invention is to provide a water based thickening additive.

DISCLOSURE OF THE INVENTION

A first aspect of the invention is a low density cement slurry for use in a wellbore comprising a cement blend and an alkali swellable polymer as a thickening additive.

The alkali swellable polymer can be a liquid. This makes it easier to handle, especially in offshore operations A preferred low density cement slurry comprises a polymer that is a latex. Preferably a carboxylated acrylic copolymer latex. In a particular preferred cement slurry it comprises a styrene-butadiene copolymer latex.

The low density cement slurry can further comprise a surfactant combined with the polymer. Preferably the surfactant is present at a concentration below its critical micelle concentration. The surfactant optimizes the rheological properties of the cement.

A second aspect of the invention comprises a method of increasing the viscosity of a low density cement comprising adding an alkali swellable polymer to a cement slurry.

A method of cementing a well comprises preparing a low density cement slurry as described above; and pumping the cement slurry into a well.

MODE(S) FOR CARRYING OUT THE INVENTION

Rheology modifiers may be classified as either naturally or synthetically derived products. Naturally derived products include starch, cellulose, alginate and protein. These products incorporate building blocks of polysaccharide units, or amino acids to provide efficient, water soluble rheology modifiers. Grafting of selected moieties onto the backbone of the more widely utilized natural products, such as starch and cellulose, provides for numerous modified versions of the products, developed to address specific applications.

Three general classes of acrylic-based synthetic polymers have been used as rheology modifiers in various applications. The first class is based on homopolymers of (meth)acrylic acid and copolymers of (meth)acrylic acid, (meth)acrylate esters, and maleic acid, among many others. This group is typically referred to as the alkali swellable (or soluble) emulsions (ASE).

The second class of synthetic rheology modifiers are ASE polymers whose structures are modified by addition of hydrophobic moieties, known as the hydrophobically modified, alkali swellable emulsions (HASE). This group of polymers, more commonly referred to as associative thickeners, provides greater control of the compound rheology, over a broader range of shear rates than the traditional ASE class of synthetic polymers.

The third class of synthetic rheology modifiers is the hydrophobically modified, ethoxylated urethane resins (HEUR). This group of polymers typically consists of polyethylene glycol units of varying length, connected by urethane linkages, and terminated with hydrophobic end groups. Unlike the ASE and HASE classes, HEUR rheology modifiers are nonionic substances, and are not dependent on alkali for activation of the thickening mechanism.

Water soluble rheology modifiers as described above, impart their effect on a system through one, or more, of three distinct mechanisms. The most prevalent is the hydrodynamic, volume exclusion (HDV) mechanism. The mechanism derives its name from the fact that a substance in solution occupies some volume within the solution, thereby excluding the possibility of any other substance occupying that same volume.

Figure 1:
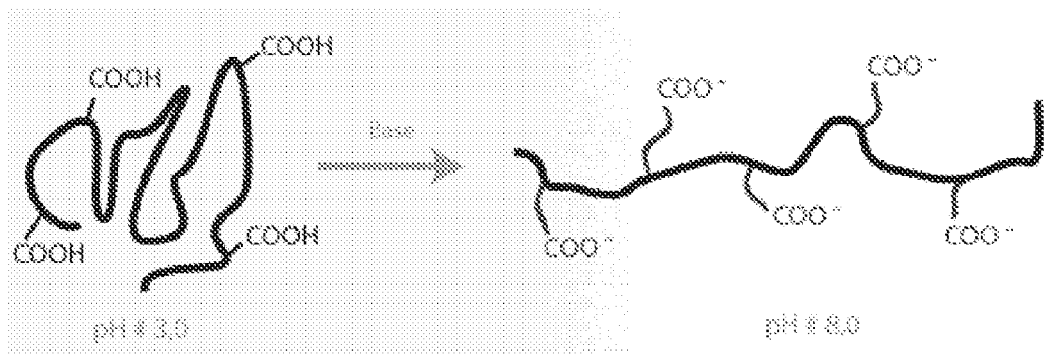
FIG. 1 shows the thickening mechanism of the polymer.

As more solute is added, less volume is available within the solution, with the resulting effect noted as an increase in solution viscosity. The particle size of a typical (H)ASE product averages approximately 0.2 microns (200 nanometers). Within this surfactant stabilized particle, exists the water insoluble, tightly coiled polymer, having a typical molecular weight in the 200,000 to 1.5 million range. Addition of alkali to the polymer emulsion results in neutralization of the carboxylic acid groups, generating an anionic charge at the acid sites along the polymer chain. The like charges repel one another resulting in swelling and uncoiling of the polymer (FIG. 1). This extremely large increase in the hydrodynamic volume of the neutralized ASE polymer, versus the same polymer in its emulsion state, is responsible for a significant build up in compound viscosity, at relatively low polymer concentration ASE rheology modifiers are based on homopolymers of (meth)acrylic acid and copolymers of (meth)acrylic acid, (meth)acrylate esters, and maleic acid, among many others:

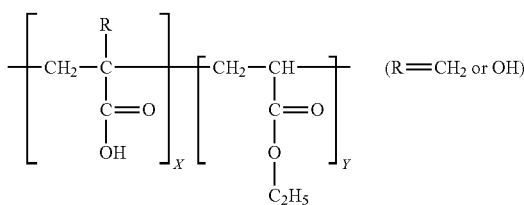

Aqueous swellable emulsions are high molecular weight polymers. They are liquid products generally commercialized at low concentration of 25/30% of dry matter, are easily soluble, and pH dependent. They provide: low-shear rate viscosity, gel structure, sag resistance and stability on time, increasing yield value, settling and sag resistance, and resistance to viscosity drop when diluting, and microbial attack.

Alkali swellable polymers based on latexes, such as TYCHEM 68710-00 a styrene-butadiene copolymer latex (typically comprising 30-55 wt % carboxylated styrene butadiene polymer; 1-5 wt % stabilizer and 45-70 wt % watert; see www.dowreichold.com/products/tyc68710.asp) from Dow Reichold Speciality Latex, are preferred as they have very high total solids and are designed with a well-controlled particle size distribution that allows it to have low viscosity at high weight solids.

A surfactant can be combined with the alkali swellable polymer for optimizing rheological properties. Surface active agents present in formulations containing an associative thickener have a direct impact on properties of the hydrophobic domains formed in solution. The performance of a surfactant is a function of the ratio of the hydrophobic portion of the molecule to the hydrophilic portion. A surfactant molecule in water, is in an energetically unfavorable state, analogous to the hydrophobic associative monomer discussed above.

In an attempt to reduce the overall free energy of the system, the surfactants will interact with one another, forming lipid bilayer and, as the concentration increases, eventually forming micelles. Such behavior allows the surfactant molecules to establish a hydrophobic environment within the bulk water phase, expelling water molecules, and providing a reduction in overall free energy to the system. Surfactant added to an associatively thickened formulation will tend to migrate toward the associative groups of the rheology modifier, aligning their hydrophobic component with those of the thickener.

Added at concentrations below the critical micelle concentration (CMC), the surfactant may form a bridge between hydrophobes of the thickener, providing a more structured matrix to the formulation, which is observed as an increase in compound viscosity Therefore, the rheology of a low solid volume fraction cement slurry can be easily optimized by using only water based low viscous additives. A further advantage of the alkali swellable polymers is that as they can be in a liquid form they are therefore easier to handle in offshore operations compared to solid formulations.

EXAMPLE 1

Cement slurries are prepared with Class G cement as described in Table 1. The rheology conditions of a control cement slurry, B1, are compared with a cement slurry comprising a latex alkali swellable polymer, B2, after conditioning at 65° C. The cement slurry comprising the polymer shows increased plastic viscosity (PV) and Ty.

TABLE 1

| Slurry | B1 | B2 |
|---|---|---|
| Cement | Class G | Class G |
| Antifoam (gps) | 0.05 | 0.05 |
| Retarder (gps) | 0.15 | 0.15 |
| Sodium silicate (gps) | 0.42 | 0.42 |
| CaCl$_2$/% BWOC | 1.5 | 1.5 |
| Latex Alkali Swellable (gps) | — | 0.8 |
| Density (ppg) | 12.4 | 12.4 |
| Rheology After Conditioning at 65° C. | | |
| $\tau_y$ (lb/100 sqft) | 6 | 12 |
| PV (cP) | 8 | 23 |

EXAMPLE 2

Figure 2:
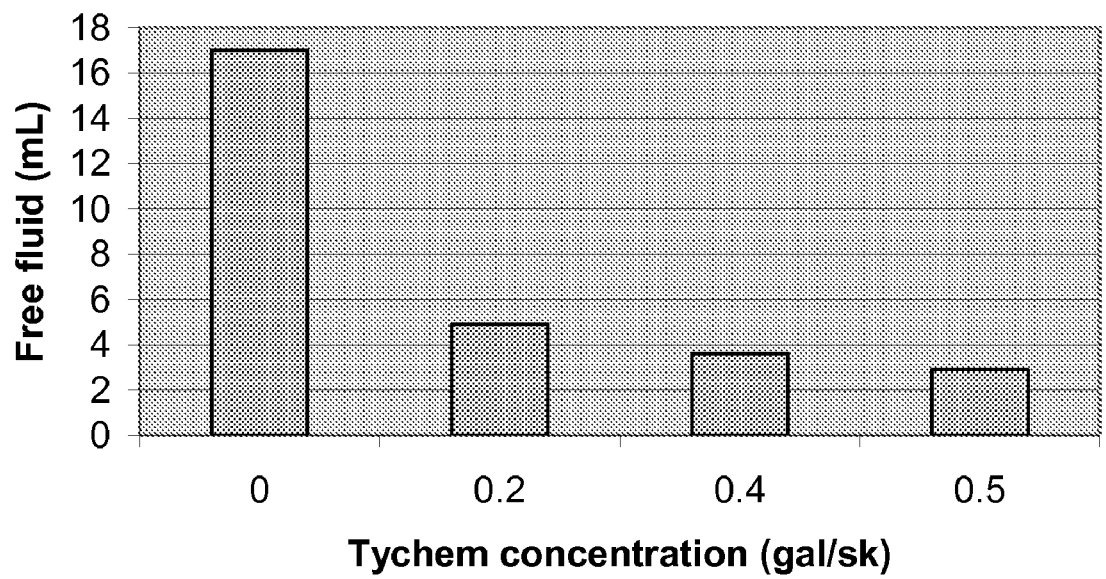
FIG. 2 shows the free fluid loss at different concentrations of Tychem.

The effect of TyChem 68710 is evaluated as an antisettling agent in a 1890 kg/m$^3$ class G cement slurry at different concentrations. Class G cement slurries are prepared as indicated in Table 2 with variable concentrations of Tychem 68710. The results are shown in Table 3 and FIG. 2. The fluid loss of the slurry will decrease and the gel and yield points increase with an alkali swellable latex compared with a slurry not containing an alkali swellable polymer.

TABLE 2

| Density | 1890 kg/m³ | 1890 kg/m³ | 1890 kg/m³ | 1890 kg/m³ |
|---|---|---|---|---|
| D047 | Enough to prevent foaming ~0.2 g | | | |
| D080 | 6.4 g | 6.4 g | 6.4 g | 6.4 g |
| Tychem 68710 | 0 | 13.8 g | 27.7 g | 34.6 g |
| Class G | 779 g | 779 g | 779 g | 779 g |
| Water | 348 g | 334 g | 321 g | 314 g |

D047: Antifoam (polypropylene glycol), D080: Dispersant (sodium polynapthalene sulphonate)

TABLE 3

| Tychem (gps) | 0 | 0.2 gal/sk | 0.4 gal/sk | 0.5 gal/sk |
|---|---|---|---|---|
| PV (mPa·s) | 24 | 14 | 31 | 38 |
| Ty (Pa) | 0.58 | 26.5 | 13.1 | 8 |
| 10 s (Pa) | 1.5 | 8.7 | 13.3 | 11.2 |
| 10 min (Pa) | 5.1 | 18.4 | 37.8 | 25.0 |
| 60° C. | | | | |
| PV (mPa·s) | 16 | 97 | | 41 |
| Ty (Pa) | 1.3 | 41.5 | | 33.4 |
| 10 s (Pa) | 1.5 | 10.2 | | 11.2 |
| 10 min (Pa) | 4 | 11.8 | | 25 |
| Free fluid (ml) at ambient | 17 | 4.9 | 3.6 | 2.9 |

EXAMPLE 3

The effect of low concentration of Tychem with different dispersant concentrations is evaluated. Class G cement slurries are prepared as shown in Table 4. Low concentrations of Tychem with differing concentrations of the dispersant D080 are compared and the results as shown in Table 5 are obtained. The result indicate that viscosity of the cement slurry can be controlled by changing the dispersant concentration.

TABLE 4

| Density | 1890 kg/m³ | 1890 kg/m³ | 1890 kg/m³ | 1890 kg/m³ | 1890 kg/m³ |
|---|---|---|---|---|---|
| D047 | Enough to prevent foaming ~2 g | | | | |
| D080 | 8.6 g | 8.6 g | 5.2 g | 5.2 g | 6.4 g |
| Tychem 68710 | 6.9 g | 13.8 g | 6.9 g | 13.8 g | 0 |
| Class G cement | 779 g | 779 g | 779 g | 779 g | 779 g |
| Water | 341 g | 334 g | 341 g | 334 g | 348 g |

D047: Antifoam (polypropylene glycol), D080: Dispersant (sodium polynapthalene sulphonate)

TABLE 5

| | Tychem (gps) | | | |
|---|---|---|---|---|---|
| | 0.1 gal/sk | 0.2 gal/sk | 0.1 gal/sk | 0.2 gal/sk | 0 |
| PV (mPa·s) | 16 | 25 | 30 | | 24 |
| Ty (Pa) | 19.9 | 31.9 | 28.7 | | 0.58 |
| 10 s (Pa) | 10.2 | 18.9 | 11.8 | | 1.5 |
| 10 min (Pa) | 24 | 36.8 | 21.5 | | 5.1 |
| 60° C. | | | | | |
| PV (mPa·s) | 38 | | 38 | | 16 |
| Ty (Pa) | 8.8 | | 27.3 | | 1.3 |
| 10 s (Pa) | 6.1 | | 7.7 | | 1.5 |
| 10 min (Pa) | 6.6 | | 7.7 | | 4 |
| Free fluid (ml) at ambient | 4.7 | 5.5 | 5.6 | 5.3 | 17 |

EXAMPLE 4

The effect of Tychem as viscosifier in a 1380 kg/m³ class G cement slurry extended with sodium silicate is evaluated. Class G cement slurries are prepared as indicated in Table 6. The results are shown in Table 7. PV and Ty increase with the addition of the latex in a low density cement both before and after conditioning at 60° C.

TABLE 6

| | D8 | D9 | D10 | E2 |
|---|---|---|---|---|
| Density | 11.5 | 11.5 | 11.5 | 11.5 |
| SVF | 16.6% | 17.1% | 17.1% | 15.6 |
| Class G cement | 51.9 g | 53.5 g | 53.3 g | 48.8 g |
| D075 | 1.949 mL | 1.9 mL | 1.89 mL | 1.6 mL |
| S001 | 0.735 g | 0.75 g | 0.75 g | 0.68 g |
| Tychem | — | 1.42 mL | 2.84 mL | 3.44 mL |
| D110 | 1.15 mL | 1.18 mL | 1.18 mL | 1.08 mL |
| D175 | | 0.14 mL | | 0.13 mL |

Quantities are for 100 mL, D075: Extended (sodium silicate), S001: Calcium chloride (solid 77-80%), D110: Retarder (Calcium glucoheptonate), D175: Antifoam (silicone emulsion)

TABLE 7

| | D8 | D9 | D10 | E2 |
|---|---|---|---|---|
| Tychem/D075 | — | 0.75 v/v | 1.50 v/v | 2.15 v/v |
| | — | 0.58 w/w | 1.15 w/w | 1.65 w/w |
| PV (mPa·s) | 5 | 8 | 8 | 10 |
| Ty (Pa) | 2.2 | 12.4 | 13.4 | 9.4 |
| 60° C. | | | | |
| PV (mPa·s) | 4 | 9 | 12 | 12 |
| Ty (Pa) | 1.3 | 1.9 | 1.9 | 2.4 |

EXAMPLE 4

Various alkali swellable latex are evaluated for their performance as viscosifiers in a 1380 kg/m³ class G cement slurry. Low density class G cement slurry are extended with sodium silicate and prepared as indicated in Table 8. Alcogum products are obtained from Alco Chemicals. Alcogum L products are alkali swellable lattices and Alcogum SL products are hydrophobically modified alkali swellable lattices (acrylate-based emulsion copolymers; see www.alcochemical.com/products-markets/products/lseries.asp). The results are shown in Table 9.

TABLE 8

| | Tychem | Alcogum SL920 | Alcogum SL117 | Alcogum L289 |
|---|---|---|---|---|
| Density | 11.5 | 11.5 | 11.5 | 11.5 |
| SVF | 17.1% | 16.1% | 16.1% | 16.1 |

TABLE 8-continued

|  | Tychem | Alcogum SL920 | Alcogum SL117 | Alcogum L289 |
|---|---|---|---|---|
| Class G | 321 g | 302 g | 302 g | 302 g |
| Water | 467.9 g | 486.4 g | 486.4 g | 486.4 g |
| D075 | 15.72 g | 16.3 g | 16.3 g | 16.3 g |
| S001 | 4.5 g | 4.2 g | 4.2 g | 4.2 g |
| Latex | 9.1 g | 9.44 g | 9.44 g | 9.44 g |
| D110 | 8.05 g | 7.58 g | 7.58 g | 7.58 g |
| D175 | 0.85 g | 0.8 g | 0.8 g | 0.8 g |

Quantities are for 600 mL, D075: Extended (sodium silicate), S001: Calcium chloride (solid 77-80%), D110: Retarder (Calcium glucoheptonate), D175: Antifowm (silicone emulsion)

TABLE 9

|  | Tychem | Alcogum SL920 | Alcogum SL117 | Alcogum L289 |
|---|---|---|---|---|
| PV (mPa·s) | 8 | 12.9 | 16.2 | 9.9 |
| Ty (Pa) 60° C. | 12.4 | 4.8 | 7.9 | 8.3 |
| PV (mPa·s) | 9 | 20.3 | 18.5 | 25 |
| Ty (Pa) | 1.9 | 1.6 | 1.1 | 2.3 |

Alcogum L289 has the higher Ty at 60° C. and less of a change in rheology with increasing temperature. However all of the lattices show benefits compared with no latex.

Cement slurries prepared according to the invention with an alkali swellable polymer as an additive, have a higher viscosity than cement slurries not comprising an alkali swellable polymer.

Changes may be made while still remaining within the scope of the invention.

The invention claimed is:

1. A low density cement slurry for use in a wellbore comprising a cement blend, a surfactant and an alkali swellable polymer as a thickening additive, the solid-volume fraction (SVF) of the cement slurry being less than about 40%, wherein the surfactant is present at a concentration below the critical micelle concentration.

2. The low density cement slurry according to claim 1 wherein the thickening additive is a liquid.

3. The low density cement slurry according to claim 2 wherein the polymer is a latex.

4. The low density cement slurry according to claim 2 wherein the polymer is a carboxylated acrylic copolymer latex.

5. The low density cement slurry of claim 2 wherein the polymer is a styrene-butadiene copolymer latex.

6. The low density cement slurry according to claim 1 wherein the polymer is a latex.

7. The low density cement slurry according to claim 6 wherein the polymer is a carboxylated acrylic copolymer latex.

8. The low density cement slurry of claim 6 wherein the polymer is a styrene-butadiene copolymer latex.

9. The low density cement slurry according to claim 1 wherein the polymer is a carboxylated acrylic copolymer latex.

10. The low density cement slurry according to claim 1 wherein the polymer is a styrene-butadiene copolymer latex.

11. A method of increasing the viscosity of a low density cement comprising adding, a surfactant and an alkali swellable polymer to a cement slurry, wherein the solid-volume fraction (SVF) of the cement slurry is less than about 40% and wherein the surfactant is present at a concentration below the critical micelle concentration.

12. The method of claim 11, wherein the cement blend, water and alkali swellable polymer are mixed simultaneously.

13. The method of claim 11, wherein the polymer is a latex.

14. The method of claim 11, wherein the polymer is a carboxylated acrylic copolymer latex.

15. The method of claim 11, wherein the polymer is a styrene-butadiene copolymer latex.

16. A method of cementing a well comprising:
(i) preparing a low density cement slurry comprising a cement blend, a surfactant and an alkali swellable polymer as a thickening additive, wherein the solid-volume fraction (SVF) of the cement slurry is less than about 40%, wherein the surfactant is present at a concentration below the critical micelle concentration, and wherein the surfactant, the polymer, cement blend and water are mixed simultaneously; and
(ii) pumping the cement slurry into a well.

17. The method of claim 16, wherein the thickening additive is a liquid.

18. The method of claim 16, wherein the polymer is a latex.

19. The method of claim 16, wherein the polymer is a carboxylated acrylic copolymer latex.

20. The method of claim 16, wherein the polymer is a styrene-butadiene copolymer latex.

* * * * *